United States Patent
Angenendt et al.

(10) Patent No.: US 10,309,806 B2
(45) Date of Patent: Jun. 4, 2019

(54) HOLDER

(71) Applicant: SICK AG, Waldkirch/Breisgau (DE)

(72) Inventors: Christoph Angenendt, Freiburg (DE); Gerd Allgeier, Biederbach (DE)

(73) Assignee: SICK AG, Waldkirch/Breisgau (DE)

( * ) Notice: Subject to any disclaimer, the term of this patent is extended or adjusted under 35 U.S.C. 154(b) by 312 days.

(21) Appl. No.: 15/357,210

(22) Filed: Nov. 21, 2016

(65) Prior Publication Data
US 2017/0146373 A1    May 25, 2017

(30) Foreign Application Priority Data

Nov. 23, 2015   (DE) .................. 10 2015 120 249

(51) Int. Cl.
| | |
|---|---|
| *F16M 11/14* | (2006.01) |
| *G01D 11/30* | (2006.01) |
| *F16M 11/10* | (2006.01) |
| *F16M 11/18* | (2006.01) |
| *F16M 11/20* | (2006.01) |
| *F16M 13/02* | (2006.01) |

(52) U.S. Cl.
CPC .............. *G01D 11/30* (2013.01); *F16M 11/10* (2013.01); *F16M 11/18* (2013.01); *F16M 11/2028* (2013.01); *F16M 13/02* (2013.01)

(58) Field of Classification Search
CPC .... G01D 11/30; F16M 11/10; F16M 11/2028; F16M 13/02
USPC .................... 248/183.1, 278.1, 292.12, 184.1
See application file for complete search history.

(56) References Cited

U.S. PATENT DOCUMENTS

| | | | | |
|---|---|---|---|---|
| 3,057,005 A |  | 10/1962 | Dishaw | |
| 6,007,367 A | * | 12/1999 | Gehbauer | ............ H01R 4/2433 |
| | | | | 439/402 |
| 6,264,152 B1 | * | 7/2001 | Bloch | ................. F16M 11/126 |
| | | | | 248/274.1 |

(Continued)

FOREIGN PATENT DOCUMENTS

| | | |
|---|---|---|
| DE | 3117118 A1 | 11/1982 |
| DE | 9413817 U1 | 11/1994 |

(Continued)

OTHER PUBLICATIONS

European Search Report dated Apr. 17, 2017 in corresponding European Application No. 16199242.5.

*Primary Examiner* — Gwendolyn W Baxter
(74) *Attorney, Agent, or Firm* — Nath, Goldberg & Meyer; Jerald L. Meyer

(57) ABSTRACT

A holder for an optoelectronic sensor comprises a first holder part that is configured for fastening to a fixed-position fixing surface and a second holder part that can be coupled to a housing of the optoelectronic sensor, with the second holder part being rotatable relative to the first holder part about a first pivot axis. Provision is made that a receiver for a screwdriver blade is provided at the second holder part and a toothed arrangement is provided at the first holder part, or vice versa, wherein at least one tooth of the toothed arrangement projects into the receiver such that it can be acted on by one blade end of a screwdriver blade introduced into the receiver while supporting the other blade end at an abutment section of the receiver to rotate the second holder part with respect to the first holder part about a first pivot axis.

20 Claims, 6 Drawing Sheets

(56) References Cited

U.S. PATENT DOCUMENTS

| | | | |
|---|---|---|---|
| 7,142,168 B1 * | 11/2006 | Sinclair | H01Q 1/12 343/882 |
| 7,954,777 B2 * | 6/2011 | Bohm | F16M 11/10 248/274.1 |
| 2002/0084396 A1 * | 7/2002 | Weaver | F16M 11/10 248/278.1 |
| 2005/0243004 A1 | 11/2005 | White et al. | |
| 2006/0115265 A1 | 6/2006 | Elberbaum | |
| 2009/0294619 A1 | 12/2009 | David | |

FOREIGN PATENT DOCUMENTS

| | | | |
|---|---|---|---|
| DE | 29507071 U1 | 10/1995 | |
| EP | 1852646 A2 | 11/2007 | |

* cited by examiner

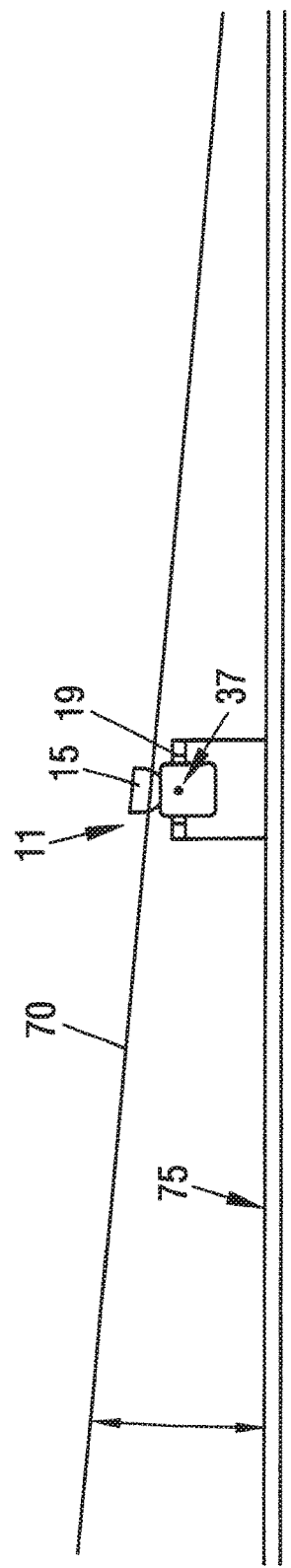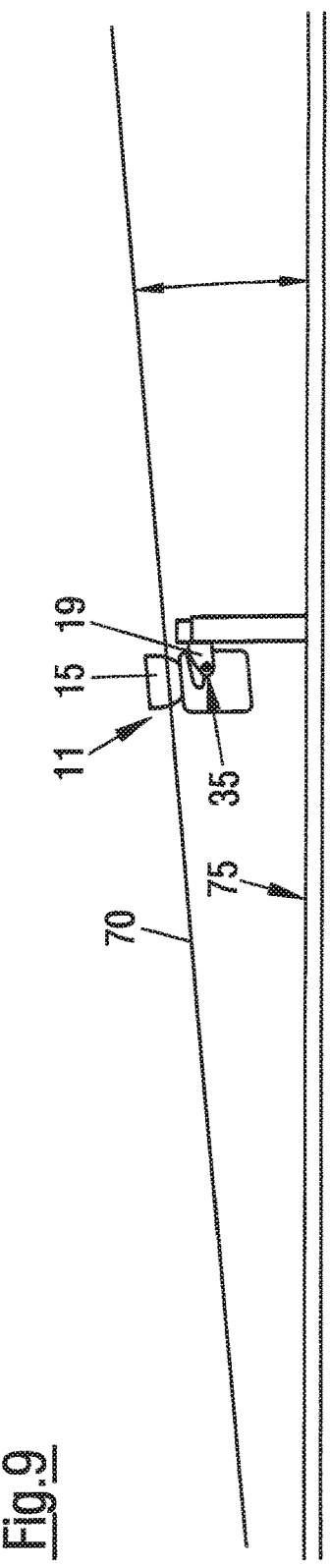

HOLDER

The present invention relates to a holder for an optoelectronic sensor, in particular for a laser scanner, having a first holder part that is configured for a direct or indirect fastening to a fixed-position fixing surface such as a wall, and having a second holder part that can be coupled to a housing of the optoelectronic sensor, wherein the second holder part is rotatable relative to the first holder part about a first pivot axis.

It is frequently necessary in the assembly of optoelectronic sensors to align the sensor head with respect to a fixed-position coordinate system, that is, for example, to align the scan plane of a laser scanner in parallel with the floor. This can be effected in that the sensor is installed by means of a holder of the named kind and in that in this respect the second holder part is pivoted relative to the first holder part for so long until the desired alignment of the sensor head is achieved.

Common holders, however, only allow a relatively coarse adjustment of the holder parts so that the installation process is often time-consuming and tedious.

There is therefore a need for sensor holders that allow a more exact and simpler adjustment.

This object is satisfied by a holder having the features of claim 1.

The invention provides a receiver for a screwdriver blade being provided at the second holder part and a toothed arrangement being provided at the first holder part, or vice versa, wherein at least one tooth of the toothed arrangement projects into the receiver such that it can be acted on by one blade end of a screwdriver blade introduced into the receiver while supporting the other blade end at an abutment section of the receiver to rotate the second holder part with respect to the first holder part about the first pivot axis.

A fine adjustment of the two holder parts is possible by rotating the screw driver. The inclination of the sensor to be installed can thus be set particularly exactly. Complex and/or expensive special tools are not necessary since a commercial slotted screwdriver can be used for the adjustment procedure. It is an advantage of the invention that the receiver and the toothed arrangement can be manufactured relatively simply and can, for example, be molded directly at the respective holder parts.

The invention does not preclude the actual adjustment taking place using a different tool than a slotted screwdriver that has a blade corresponding to a standard slotted screwdriver. A special tool could in particular be provided for the adjustment. The provision of a special tool for the holder, for example, is, however, advantageously not absolutely necessary by the suitability for use of a screwdriver blade.

The instruction with respect to a slotted screwdriver in accordance with the claim is to be understood in this context such that a suitability of using a slotted screwdriver blade is described here. Any other tool should thus also be meant that is admittedly not explicitly a slotted screwdriver, but that can nevertheless be used as such if it has an element similar to the slotted screwdriver blade.

The abutment section preferably comprises two oppositely disposed abutment surfaces which are formed by respective inner wall regions of the receiver. The blade end of the screwdriver blade located at the abutment section can thus be supported at both sides so that the screwdriver can accordingly be rotated in both directions. The spacing between the two oppositely disposed abutment surfaces can be adapted to the blade thickness of a standard screwdriver blade such that a blade end is so-to-say held at the abutment section.

The receiver can expand starting from the abutment section, viewed in the direction of the toothed arrangement, to provide a free space for a rotational movement of the screwdriver blade. It is ensured by the expansion of the receiver that a blade end can move and can in so doing act on a tooth of the toothed arrangement.

A specific design of the invention provides that the receiver has a fan-like shape. The narrow end of the fan in this respect forms the abutment section, while the broad end of the fan provides the free space for the movement of the blade.

The free space can be dimensioned sufficiently to allow a screwing of a standard screwdriver blade beyond the at least one tooth projecting into the receiver. The blade can in this embodiment act consecutively on a plurality of consecutive teeth without it having to be removed from the receiver for this purpose. No multiple engagement of the screwdriver is thus necessary for the assembler, even with larger adjustment distances, which further simplifies the installation procedure.

In accordance with an embodiment of the invention, the toothed arrangement has a curved extent, in particular a concavely curved extent. The extent can in particular be adapted to the curved trajectory which the respective section of the holder part describes on the pivoting.

The extent of the toothed arrangement can specifically describe an arc of a circle whose center is on the first pivot axis.

A further embodiment of the invention provides that the toothed arrangement is designed as an internal toothed arrangement at a marginal section of a cut-out of the first or of the second holder parts overlapping the receiver. The screwdriver blade can be introduced, as required, through the cut-out into the receiver. An internal toothed arrangement at a cut-out can be manufactured particularly simply and inexpensively, in particular with a plate-like component.

The toothed arrangement preferably comprises at least two teeth and at most five teeth. This configuration has proved to be particularly favorable in practice.

In accordance with a further embodiment of the invention, the second holder part is releasably fixable to the first holder part, preferably by means of a screw connection. The rotation of the two holder parts with respect to one another can take place with a released fixing. At the end of the adjustment procedure, the holder parts can be fixed to one another in that, for example, one or more screws are tightened. The holder is then secured against an unintended adjustment.

A holder in accordance with the invention can comprise a third holder part, with the first holder part being fastenable via the third holder part to the fixed-position fixing surface, and with the first holder part being rotatable relative to the third holder about a second pivot axis, with the second pivot axis in particular extending at a right angle to the first pivot axis. This embodiment allows an alignment of the associated sensor about two pivot axes independently of one another. An inclination adjustment with two degrees of freedom is in particular important on the installation of laser scanners in which the scan plane frequently has to extend exactly in parallel with a reference plane such as with the floor.

A preferred embodiment of the invention provides that a further receiver for a screwdriver blade is provided at the third holder part and a further toothed arrangement is provided at the first holder part, or vice versa, with at least one tooth of the further toothed arrangement projecting into the further receiver such that it can be acted on by one blade end of a screwdriver blade introduced into the further receiver while supporting the other blade end at an abutment section of the further receiver to rotate the first holder part with respect to the third holder part about the second pivot axis. A sensitive inclination adjustment of the holder about two different pivot axes can thus take place by means of one and the same screwdriver.

The third holder part is preferably of plate shape to ensure a simple manufacture. The third holder part can specifically be designed as a simple holding plate for a wall installation, a ceiling installation or a rack installation. Such a holding plate can be provided with a plurality of recesses, with at least one of the recesses forming a receiver for a screwdriver blade and at least one further recess being provided for leading through a fastening means such as a screw.

In accordance with a further embodiment of the invention, the first holder part and the second holder part are designed as hoops plugged into one another with a respective two substantially parallel limbs, with the toothed arrangement being provided at a limb of the first holder part and the receiver being provided at the adjacent limb of the second holder part, or vice versa. This allows a particularly simple and space saving construction.

Respective arrangements of a receiver and of a toothed arrangement can be provided at both limb pairs of the hoops plugged into one another. This allows an adjustment of the holder selectively from one side or from the opposite side. This facilitates the installation in that one side of the holder is difficult to access or cannot be accessed at all in some application situations.

Further developments of the invention are also set forth in the dependent claims, in the description and in the enclosed drawing.

The invention will be described in the following by way of example with reference to the drawings.

FIG. 8 is a front view of a laser scanner which is fastened to a wall section by means of a holder in accordance with the invention; and FIG. 9 is a side view of the laser scanner shown in FIG. 8.

Figure 1:
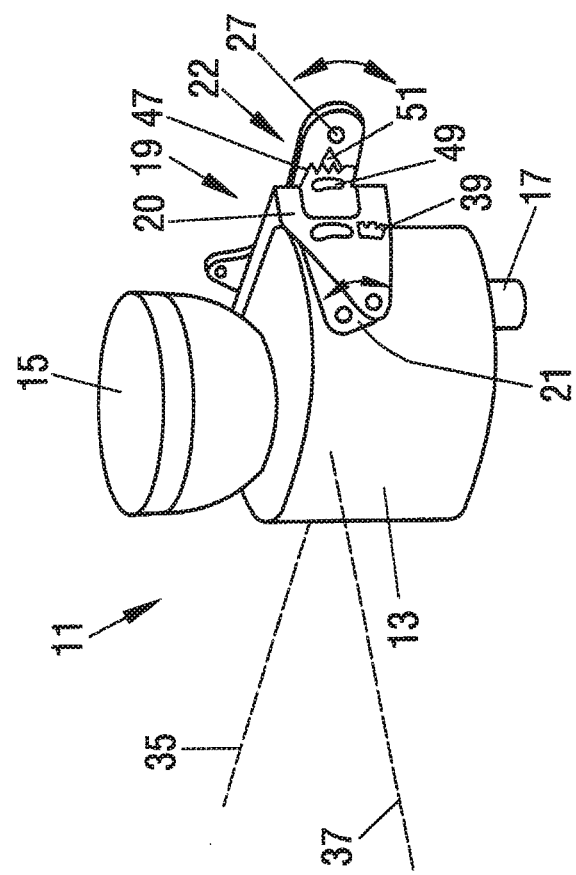
FIG. 1 is a perspective view of a laser scanner in a holder in accordance with the invention.
Figure 2:
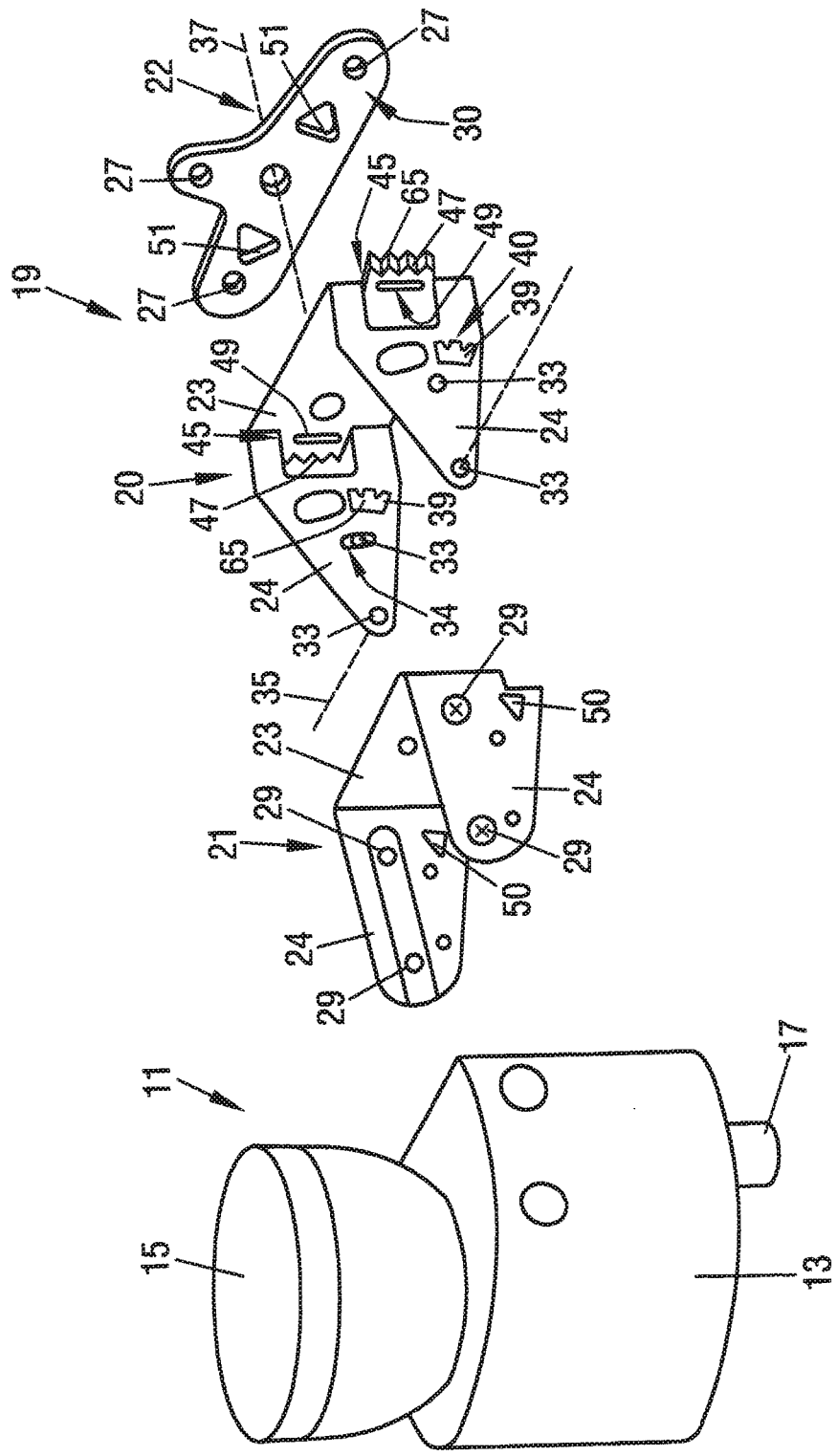
FIG. 2 is an exploded representation of the arrangement shown in FIG. 1.

The laser scanner 11 shown in FIGS. 1 and 2 comprises a sensor housing 13, a scanning head 15 as well as a supply and signal connector 17. The scanning head 15 is preferably configured to span a scan plane by means of a moved laser beam. A holder 19 in accordance with the invention serves to fasten the laser scanner 11 to a fixed-position fixing surface such as a wall, a ceiling, a support component or the like. As can be recognized in FIG. 2, the holder 19 is designed in three parts, that is it comprises a first holder part 20, a second holder part 21 as well as a third holder part 22.

While the first holder part 20 arranged centrally in FIG. 2 and the second holder part 21 arranged at the left in FIG. 2 are each designed as hoops having a central web 23 and two at least substantially parallel limbs 24, the third holder part 22 arranged at the right in FIG. 2 is designed as a plate.

The fastening of the holder 19 to the fixed-position fixing surface takes place via the third holder part 22 that is accordingly provided with a plurality of fastening holes 27 for leading through installation screws, not shown. Two respective screws 29 are located at the limbs 24 of the second holder part 21 and the second holder part 21 can be screwed to the sensor housing 13 by means of them.

Differently arranged fixing screws 33 are provided for fixing the individual holder parts 20, 21, 22 with respect to one another.

Figure 3:
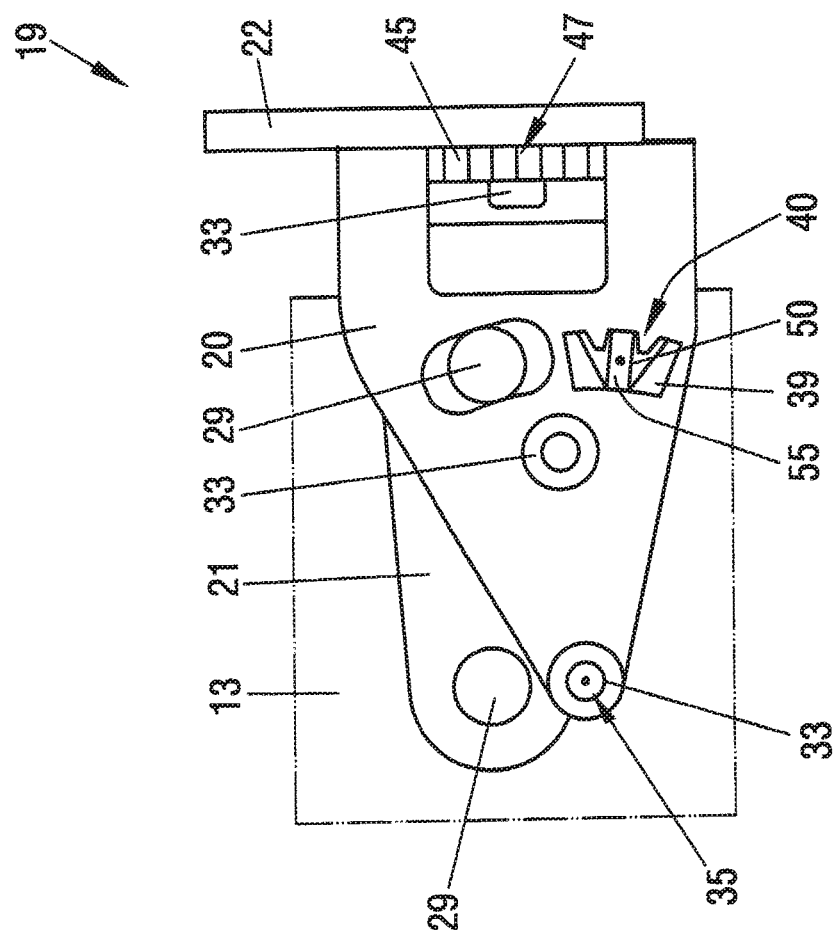
FIG. 3 is an enlarged side part view of the arrangement shown in FIG. 1.
Figure 4:
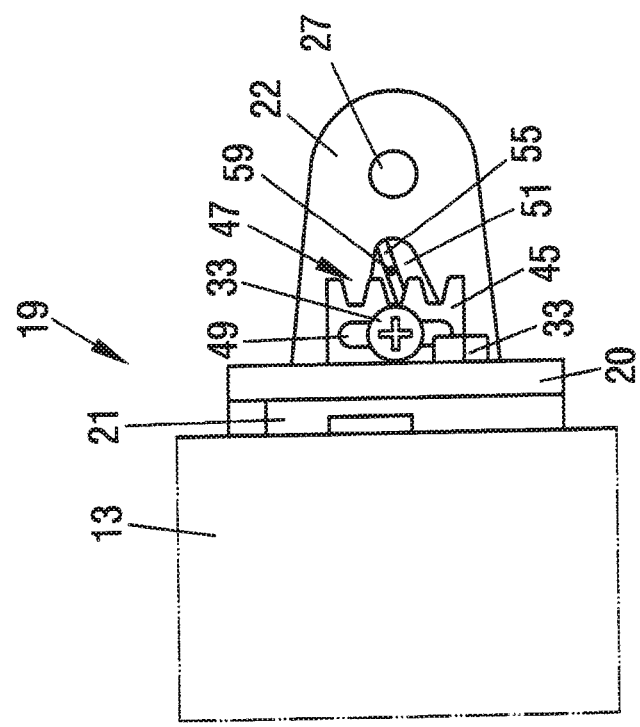
FIG. 4 is an enlarged part view of the arrangement shown in FIG. 1 from the front.

In the assembled state of the holder 19, the two hoop-shaped holder parts 20, 21 are plugged into one another and the first holder part 20 contacts the front side 30 of the third holder part 22. The first holder part 20 is furthermore fixable to the second holder part 21 by means of fixing screws 33. The first holder part 20 is equally fixable to the third holder part 22. The fixing screws used for the last-named fixing process are omitted in FIG. 2 for reasons of clarity. However, such a fixing screw 33 provided for fixing the first holder part 20 to the third holder part 22 is shown in FIGS. 3 and 4.

When the fixing screws 33 are released, the three holder parts 20, 21, 22 can be moved relative to one another. The second holder part 21 can specifically be rotated relative to the first holder part 20 about a first pivot axis 35 and the second holder part 21 can be rotated with respect to the third holder part 22 about a second pivot axis 37 extending at a right angle to the first pivot axis 35. The screw axes of the two fixing screws 33 remote from the central web 23 of the first holder part 20 coincide with the first pivot axis 35. The two fixing screws 33 facing the central web 23 are seated in elongate holes 34 of which only one can be recognized in FIG. 2 due to the wide screw head. The elongate holes 34 allow a pivoting of the second holder part 21 relative to the first holder part 20.

Two oppositely disposed cut-outs 39 are provide at the two limbs 24 of the first holder part 20 and a respective internal toothed arrangement 40 having two teeth 65 is formed at them. In addition, as shown, two projections 45 additionally extend from the central web 23 of the first holder part 20 and respective external toothed arrangements 47 having four teeth 65 are formed at them. The projections 45 are provided with passages 94 of an elongate hole type. A fixing of the first holder part 20 to the third holder part 22 can take place by leading respective fixing screws 33 (FIGS. 3 and 4) through the passages 49 and by screwing the fixing screws 33 into threaded holes, not shown, of the third holder part 22.

Respective fan-shaped recesses 50 are provided at the limbs 24 of the second holder part 21 and form recesses for a screwdriver blade 55. Two fan-shaped recesses 51 are equally provided at the third holder part 22.

As can be recognized in FIG. 3, the cut-outs 39 provided at the first holder part 20 overlap the fan-shaped recesses 50 provided at the second holder part 21 in the assembled state of the holder 19. As can be recognized in FIG. 4, the projections 45 provided at the first holder part 20 equally overlap the fan-shaped recesses 51 provided at the third holder part 22. In this respect, the teeth 65 of the internal toothed arrangements 40 respectively project into the broad region of the fan-shaped recesses 50. The teeth 65 of the external toothed arrangements 47 respectively project into the broad region of the fan-shaped recesses 51.

Figure 5:
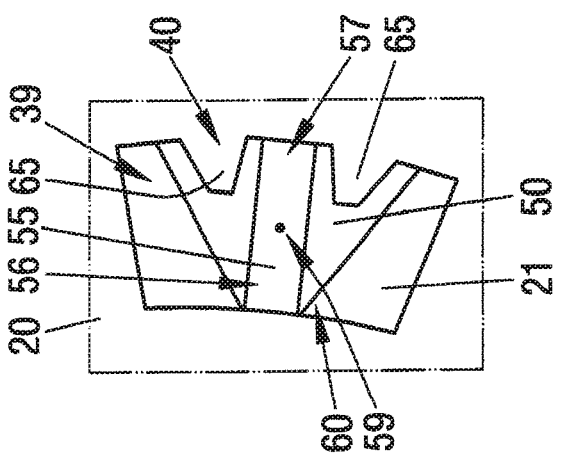
FIG. 5 shows a receiver of the holder shown in FIG. 1 into which a screwdriver blade is introduced in a first position.
Figure 6:
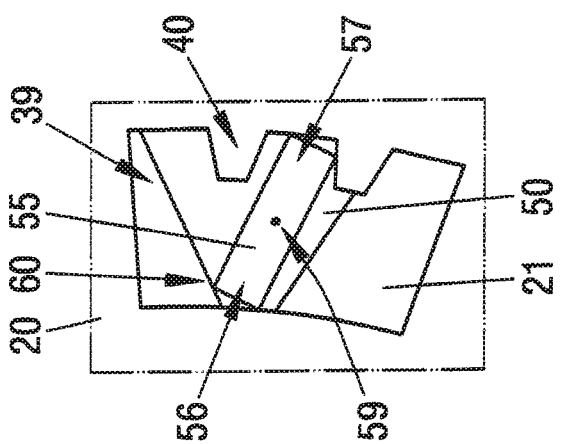
FIG. 6 shows the arrangement in accordance with FIG. 5 with a slightly rotated screwdriver blade.
Figure 7:
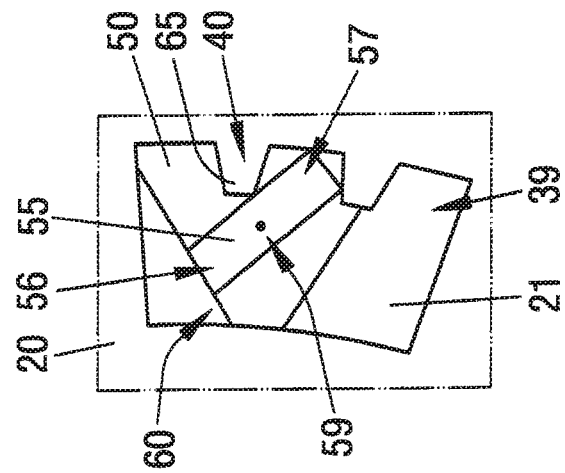
FIG. 7 shows the arrangement in accordance with FIG. 5 with a screwdriver blade rotated further with respect to FIG. 6.

To adjust the holder 19, the screwdriver blade 55 of a commercial slotted screwdriver is introduced into one of the fan-shaped recesses 50, 51, as is shown in FIGS. 5 to 7 with reference to a recess 50 provided at the second holder part 21. A first blade end 56 of the screwdriver blade 55 is in this respect located at the narrow end of the fan-shaped recess 50, while the second blade end 57 is arranged between two teeth 65 of the internal toothed arrangement 40. On a rotation of the screwdriver blade 55 about the screwdriver axis 59, the first blade end 56 is supported at an abutment section 60 of the fan-shaped recess 50 and the second blade end 57 acts on a tooth 65 of the internal toothed arrangement 40. The internal toothed arrangement 40 is thereby displaced with respect to the fan-shaped recess 50 and the second holder part 21 is accordingly rotated with respect to the first holder part 20 about the first pivot axis 35 (FIG. 2). As can be seen from FIG. 7, the free space for the movement of the screwdriver blade 55 formed by the broad region of the fan-shaped recess 50 is so large that said screwdriver blade can rotate beyond the tooth 65, with the first blade end 56 sliding out of the abutment section 60 and the second blade end 57 moving into the abutment section 60 after a further rotation. The screwdriver blade 55 can thus be rotated about the screwdriver axis 59 multiple times, as required, without the screwdriver having to be placed on again for this purpose. An inclination adjustment of the laser scanner 11 by, for example, 10° is possible overall by rotating the screwdriver.

It is understood that a rotation of the first holder part 20 with respect to the third holder part 20 about the second pivot axis 37 can be carried out in an analog manner. The assembler can in this respect select which of the two fan-shaped recesses 50 of the first holder part 20 and which of the two fan-shaped recesses 51 of the second holder part 21 he will use for the adjustment.

As is illustrated in FIGS. 8 and 9, the holder 19 in accordance with the invention allows the exact alignment of the scan plane 70 spanned by the scanning head 15 in parallel with the floor 75 in that the inclination about the first pivot axis 35 is adjusted first and the inclination about the second pivot axis 37 is subsequently adjusted. As soon as the desired alignment of the scan plane 70 has been reached, the fixing screws 33 are screwed tight so that the three holder parts 20, 21, 22 are fixed to one another and an unintended displacement of the holder 19 is avoided.

The holder 19 in accordance with the invention overall allows a simple and fast fine adjustment of the scan plane 70 of the laser scanner 11.

REFERENCE NUMERAL LIST

11 laser scanner
13 sensor housing
15 scanning head
17 supply and signal connector
19 holder
20 first holder part
21 second holder part
22 third holder part
23 central web
24 limb
27 fastening hole
29 screw
30 front side
33 fixing screw
34 elongate hole
35 first pivot axis
37 second pivot axis
39 cut-out
40 internal toothed arrangement
45 projection
47 external toothed arrangement
49 passage
50 fan-shaped recess
51 fan-shaped recess
55 screwdriver blade
56 first blade end
57 second blade end
59 screwdriver axis
60 abutment section
65 tooth
70 scan plane
75 floor

The invention claimed is:

1. A holder for an optoelectronic sensor,
having a first holder part that is configured for a direct or indirect fastening to a fixed-position fixing surface and
having a second holder part that can be coupled to a housing of the optoelectronic sensor, wherein the second holder part is rotatable relative to the first holder part about a first pivot axis,
wherein a receiver for a screwdriver blade is provided at the second holder part and a toothed arrangement is provided at the first holder part, or vice versa, with at least one tooth of the toothed arrangement projecting into the receiver such that it can be acted on by one blade end of a screwdriver blade introduced into a receiver while supporting another blade end at an abutment section of the receiver to rotate the second holder part with respect to the first holder part about the first pivot axis.

2. The holder in accordance with claim 1, wherein the optoelectronic sensor is provided as a laser scanner.

3. The holder in accordance with claim 1, wherein the fixed-position fixing surface is a wall.

4. The holder in accordance with claim 1,
wherein the abutment section comprises two oppositely disposed abutment surfaces which are formed by respective inner wall regions of the receiver.

5. The holder in accordance with claim 4,
wherein the receiver expands, starting from the abutment section, in the direction of the toothed arrangement to provide a free space for a rotational movement of the screwdriver blade.

6. The holder in accordance with claim 5,
wherein the receiver has a fan-shaped shape.

7. The holder in accordance with claim 5,
wherein the free space is dimensioned sufficiently to allow a screwing of a standard screwdriver blade beyond the at least one tooth projecting into the receiver.

8. The holder in accordance with claim 1,
wherein the toothed arrangement has a curved extent.

9. The holder in accordance with claim 8, wherein the toothed arrangement has a concavely curved extent.

10. The holder in accordance with claim 8,
wherein an extent of the toothed arrangement describes an arc of a circle whose center lies on the first pivot axis.

11. The holder in accordance with claim 1,
wherein the toothed arrangement is configured as an internal toothed arrangement at a marginal section of a cut-out of the first or second holder parts overlapping the receiver.

12. The holder in accordance with claim 1,
wherein the toothed arrangement comprises at least two teeth and at most five teeth.

13. The holder in accordance with claim 1,
wherein the second holder part is releasably fixable to the first holder part.

14. The holder in accordance with claim 13, wherein the second holder part is releasably fixable to the first holder part by means of a screw connection.

15. The holder in accordance with claim 1,
further comprising a third holder part, with the first holder part being fastenable via the third holder part to the fixed-position fixing surface, and with the first holder part being rotatable relative to the third holder about a second pivot axis.

16. The holder in accordance with claim 15, wherein the second pivot axis extends at a right angle to the first pivot axis.

17. The holder in accordance with claim 15,
wherein a further receiver for a screwdriver blade is provided at the third holder part and a further toothed arrangement is provided at the first holder part, or vice versa, with at least one tooth of the further toothed arrangement projecting into the further receiver such that it can be acted on by one blade end of a screwdriver blade introduced into the further receiver while supporting the other blade end at an abutment section of the further receiver to rotate the first holder part with respect to the third holder part about the second pivot axis.

18. The holder in accordance with claim 15,
wherein the third holder part is plate-shaped.

19. The holder in accordance with claim 1,
wherein the first holder part and the second holder part are designed as hoops plugged into one another with a respective two at least substantially parallel limbs, with the toothed arrangement being provided at a limb of the first holder part and with the receiver being provided at the adjacent limb of the second holder part, or vice versa.

20. The holder in accordance with claim 19,
wherein respective arrangements of a receiver and of a toothed arrangement are provided at both limb pairs of the hoops plugged into one another.

* * * * *